United States Patent [19]

Weiner

[11] 4,071,174
[45] Jan. 31, 1978

[54] MAP HOLDER FOR AUTOMOTIVE VEHICLE

[75] Inventor: Rudolf Weiner, Friedberg, Germany

[73] Assignee: Firma Weiner Geratebau - Stahlmobel, Friedberg, Germany

[21] Appl. No.: 661,771

[22] Filed: Feb. 26, 1976

[30] Foreign Application Priority Data

Feb. 27, 1975 Germany .............................. 2508599

[51] Int. Cl.$^2$ ................................................ B60R 1/00
[52] U.S. Cl. ................................ 224/29 M; 40/10 A; 248/309 R; 350/238; 350/239
[58] Field of Search .................. 224/5 V, 29 R, 29 A, 224/29 E, 29 L, 29 M, 37, 42.45 R, 42.46 R, 42.46 B 1; 40/10 A, 10 B, 16, 16.4, 16.6; 248/204, 302, 309 R, 316 D; 24/73 AC, 73 C, 255 AS, 255 R, 261 R, 261 A, 261 D; 108/44, 45; 350/238, 239; 267/178, 179

[56] References Cited

U.S. PATENT DOCUMENTS

| 1,130,689 | 3/1915 | Atkinson ......................... 224/5 V X |
| 1,410,608 | 3/1922 | Schroth .......................... 224/5 V X |
| 1,606,136 | 11/1926 | Andrews ........................... 40/10 A |
| 1,930,307 | 10/1933 | Croes ................................... 40/10 A |
| 2,090,346 | 8/1937 | De Vore ........................... 350/238 X |
| 2,176,329 | 10/1939 | Chambers ............................ 350/239 |
| 2,921,393 | 1/1960 | Wood ............................... 40/16.4 X |
| 3,091,875 | 6/1963 | Crafa ................................. 40/16.6 X |
| 3,104,895 | 9/1963 | Feuerbach ......................... 108/45 X |

FOREIGN PATENT DOCUMENTS

| 623,477 | 3/1927 | France .................................. 40/10 A |
| 690,921 | 6/1930 | France .................................. 40/10 A |
| 396,957 | 8/1933 | United Kingdom ............ 248/316 D |

Primary Examiner—Lawrence J. Oresky
Assistant Examiner—Winston H. Douglas
Attorney, Agent, or Firm—Karl F. Ross

[57] ABSTRACT

A holder for road maps or the like, viewable by the driver of an automotive vehicle, comprises a two-convolution coil spring whose turns can clamp a paper sheet between them in a generally vertical position, these turns diverging laterally over a fraction of a semicircle to facilitate insertion of the sheet. The spring terminates in a first extremity, universally jointed on a telescopic arm which is secured to the dashboard and/or the windshield of the vehicle, and in an oppositely extending second extremity carrying an adjustable mounting for a magnifying glass that is alignable with substantially any part of the area encompassed by the spring turns.

10 Claims, 4 Drawing Figures

U.S. Patent  Jan. 31, 1978  Sheet 1 of 2  4,071,174
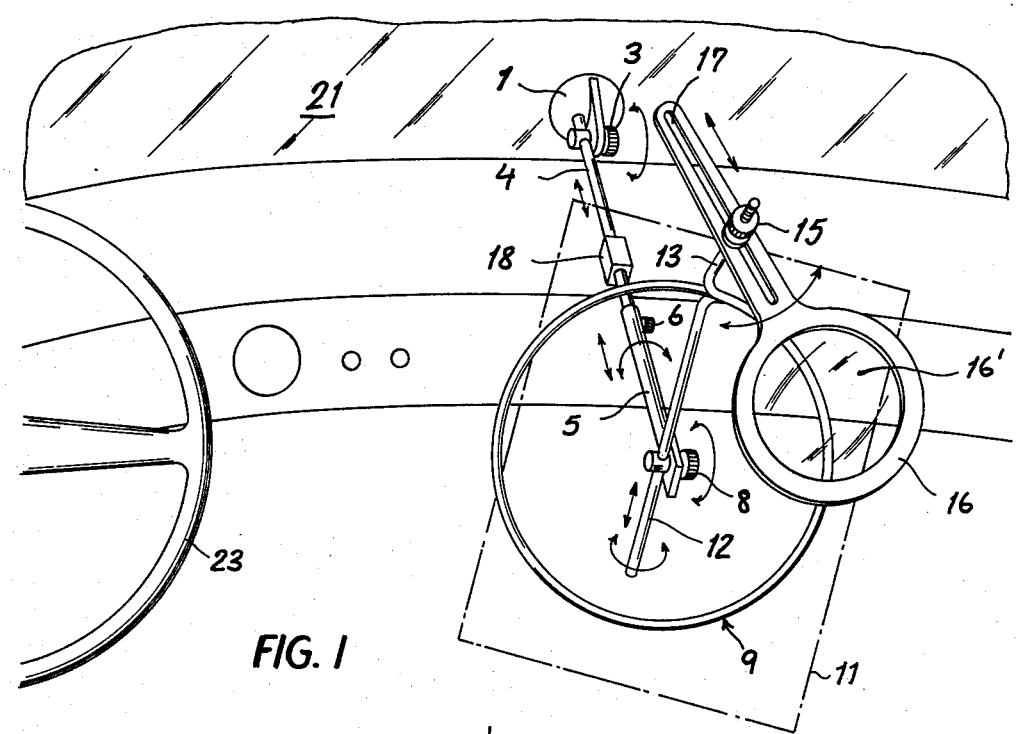
FIG. 1
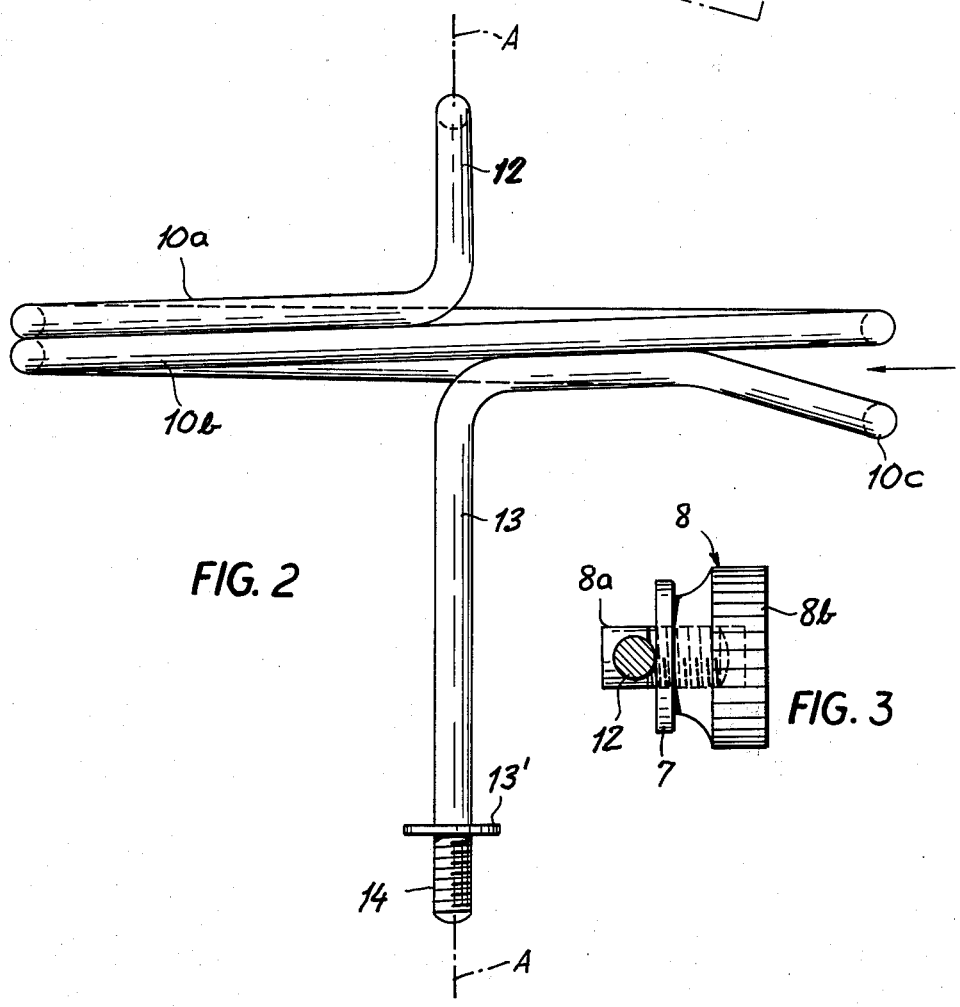
FIG. 2
FIG. 3

MAP HOLDER FOR AUTOMOTIVE VEHICLE

FIELD OF THE INVENTION

My present invention relates to a holder for road maps or the like, to be positioned within the field of view of the driver of an automotive vehicle.

BACKGROUND OF THE INVENTION

It is known, e.g. from U.S. Pat. No. 1,930,307, to mount a frame for such a map on or in the vicinity of a vehicular dashboard together with a magnifying glass. These prior devices, in which the map has to be fitted into the frame with a predetermined orientation, are not very convenient for the checking of details at locations on the map remote from the driver's seat. Thus, the driver cannot readily adjust the position of the map in its frame while operating the vehicle, having only one hand free for this purpose. Simpler devices using only a clip, e.g. as shown in German utility-model registration No. 1,665,099, have the drawback of affording limited support for the map which is thus liable to fold over, especially during summer driving with windows open, or to lose its hold and drop to the floor of the vehicle.

OBJECT OF THE INVENTION

The object of my present invention, therefore, is to provide an improved map holder of simple construction which can be readily emplaced within reach of the driver and can be easily fitted with a road map, an instruction sheet or the like in various positions even during operation of the vehicle.

SUMMARY OF THE INVENTION

I realize this object, in accordance with my present invention, by the provision of a coil spring with two closely adjoining turns adapted to clamp a map therebetween, the spring terminating in two extremities which extend in generally opposite directions from the area of the map, i.e. from a plane tangent to its aforementioned turns. One extremity of the spring is provided with support means for securing it to an inner vehicle surface adjacent the driver's seat; the other extremity carries viewing-aid means, such as a magnifying lens and/or an illuminating lamp, in a position confronting the inserted map.

Advantageously, according to another feature of my invention, the two turns designed to clamp the map diverge and reconverge over a fraction of a semicircle to facilitate insertion of the map, e.g. from the side. With a turn diameter close to the minimum dimension of the map, e.g. its minor side in the case of a rectangular sheet, the map will be securely held for a full-face viewing and will not be dislodged by vibrations and accelerations occurring in the normal operation of the vehicle.

In order to accommodate different types of vehicles and driver attitudes, I prefer to use as the support means a telescoping arm connected with the coil spring through a universal joint. The opposite end of the arm may also be provided with such a universal joint linking it with a fastening device, such as a suction cup, adapted to engage the windshield or the dashboard. Other types of fastening devices, e.g. wedges or screws receivable in slots or threaded bores of the dashboard, could be used instead. If desired, the suction cup may also be replaced by a base permanently pasted to a supporting surface in a nonobstructing position in which it will not obscure the driver's view of the road. The use of a suction cup, however, affords greater flexibility in the choice of location.

BRIEF DESCRIPTION OF THE DRAWING

The above and other features of my invention will now be described in detail with reference to the accompanying drawing in which:

FIG. 1 is a somewhat diagrammatic elevational view of a map holder according to my invention mounted within an automotive vehicle next to the driver's seat;

FIG. 2 is an enlarged edge view, seen from above, of a coil spring forming part of the map holder of FIG. 1;

FIG. 3 is an enlarged detail view of a universal joint included in the map holder.

SPECIFIC DESCRIPTION

Figure 4:
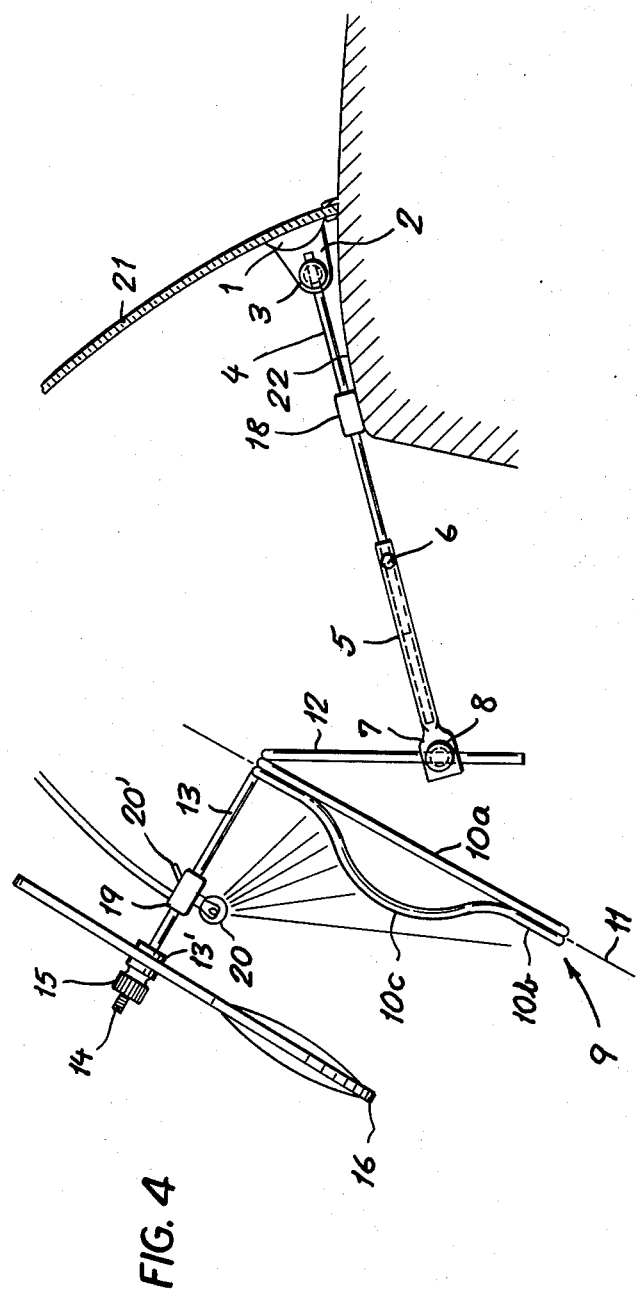
FIG. 4 is a side view of the holder assembly shown in FIG. 1.

In the drawing I have shown part of a passenger car provided with a windshield 21, a dashboard 22 and a steering wheel 23. A suction cup 1 engages the inner windshield surface and is integral with a rib 2 to which a rod 4 is adjustably secured with the aid of a universal joint 3. Rod 4, traversing an elastic bumper 18 which rests on the dashboard, forms part of a telescopic arm also including a tube 5 in which the rod may be immobilized in various positions with the aid of a thumb screw 6. The closed end of tube 5 is flattened to form a rib 7, similar to rib 2, to which an extremity 12 of a coil spring 9 is adjustably secured with the aid of another universal joint 8.

Spring 9 has two turns 10a, 10b each extending over a full convolution, about 360°. Turn 10a merges near its zenith into extremity 12 and is tangent to a plane roughly paralleling the plane of the steering wheel 23, that plane coinciding in FIG. 4 with the position of a map 11 held clamped between the two turns. The second turn 10b is deflected at 10c away from turn 10a to facilitate the insertion of the map; the deflected turn portion 10c extends over substantially less than a semicircle, e.g. an arc of 60° to 90°. The turns may have a diameter of, say, 20 to 25 cm in conformity with the usual map sizes.

Turn 10b merges near its top with another spring extremity 13, which lies substantially in the same axial plane A (FIG. 2) as extremity 12 and includes with it an obtuse angle, extending perpendicularly of the map 11 and terminating in a threaded tip 14 receiving a milled nut 15. Between nut 15 and a collar 13' on extremity 13 there is adjustably clamped a frame 16 with a handle having a slot 17, the frame holding a magnifying lens 16' of a diameter less than that of the spring turns which can thus be adjusted to overlie any part of the map within the perimeter of spring 9. FIG. 4 also shows a clip 19 by which a lamp 20 with switch 20' is mounted on spring extremity 13 to illuminate the front face of map 11.

In FIG. 3 I have shown details of the universal joint 8 which is also respresentative of the similarly constructed joint 3. Joint 8 comprises a bolt 8a which traverses the rib 7 and is engaged by a milled nut 8b so as to be rotatable about an axis transverse to that rib upon a loosening of the nut. A transverse bore in the head of bolt 8a receives the spring extremity 12 with a frictional fit; this extremity, therefore, can be raised and lowered as well as rotated about its own axis.

I claim:

1. A map holder for an automotive vehicle, comprising:
- a coil spring with two closely adjoining circular turns of about 360° each adapted to clamp a map therebetween, said turns having a diameter sufficient to encompass a major area of the map, said spring terminating in a first and a second extremity lying in a common plane and extending from the ends of said two turns in generally opposite directions from a plane tangent to said turns;
- said second extremity being substantially perpendicular to said tangent plane;
- support means engaging said first extremity for securing said spring to an inner vehicle surface adjacent a driver's seat; and
- viewing-aid means for facilitating reading of the map on said second extremity in a position confronting the encompassed area of a map inserted between said turns.

2. A map holder as defined in claim 1 wherein said viewing-aid means comprises a magnifying lens.

3. A map holder as defined in claim 2 wherein said magnifying lens has a diameter less than that of said turns and is provided with an adjustable mounting swingable on said second extremity for moving said lens to any part of the area of the map encompassed by said spring.

4. A map holder as defined in claim 1 wherein said viewing-aid means comprises an illuminating lamp.

5. A map holder as defined in claim 1 wherein said turns diverge and reconverge over a fraction of a semicircle to facilitate insertion of said map.

6. A map holder as defined in claim 1 wherein said support means comprises a telescoping arm provided with universal-joint means.

7. A map holder as defined in claim 6 wherein said universal-joint means includes a first joint connecting said arm with said first extremity and a second joint interposed between said arm and said vehicle surface.

8. A map holder as defined in claim 7 wherein said support means further comprises a fastening device linked with said arm by said second joint.

9. A map holder as defined in claim 8 wherein said fastening device comprises a suction cup.

10. A map holder as defined in claim 1 wherein said first and second extremities include an obtuse angle with each other.

* * * * *